Sept. 9, 1969 R. H. BRUNNER ET AL 3,466,514

METHOD AND APPARATUS FOR POSITIONING OBJECTS IN PRESELECTED ORIENTATIONS

Filed June 26, 1967 4 Sheets-Sheet 1

INVENTORS
ROLF H. BRUNNER
EDWARD V. WEBER

BY J. B. Kraft
ATTORNEY

United States Patent Office 3,466,514
Patented Sept. 9, 1969

3,466,514
METHOD AND APPARATUS FOR POSITIONING OBJECTS IN PRESELECTED ORIENTATIONS

Rolf H. Brunner and Edward V. Weber, Poughkeepsie, N.Y., assignors to International Business Machines Corporation, Armonk, N.Y., a corporation of New York Filed June 26, 1967, Ser. No. 648,814
Int. Cl. H02p 1/54, 5/46, 7/68
U.S. Cl. 318—18 24 Claims

ABSTRACT OF THE DISCLOSURE

A method for positioning an object in a plane with respect to first and second coordinate axes in a preselected translational (X and Y) and rotary ($\theta$) orientation by the application of three linear forces to the object in said plane. Two of the forces are applied perpendicular to one of said coordinate axes and the third force is applied perpendicular to the other coordinate axis. The method is particularly applicable to the positioning of small structures such as microelectronic components and semiconductor chips, and apparatus for performing the method on such structures is provided.

BACKGROUND OF INVENTION

Field of invention

The present invention relates to the positioning of articles in a preselected translational (X and Y) and rotary ($\theta$) orientation with respect to a pair of coordinate axes. Methods of positioning articles in preselected translational (X and Y) orientation with respect to a pair of coordinate axes by the application of two linear forces are well known in the art.

Prior art

Apparatus for performing such a method is described in the article entitled "High-Speed Servo Positioner Bonds Mesa Transistors" by Robert L. Moore at pages 270–273 of the textbook "Optoelectronic Devices and Circuits" by Samuel Weber, published 1964 by McGraw-Hill. In apparatus described in the article, the displacement of the article from its preselected position on the coordinate axes is sensed respectively in the X and Y directions by scanning multiplier phototubes which traverse the article. The output of these scanning devices indicative of the respective displacements is fed to a pair of servo-motors which move the article on a table supporting the article linearly in the X and Y directions respectively for distances equivalent to the displacements in the X and Y directions necessary to orientate the article in the preselected translational position.

The described apparatus cannot be used to orientate articles which are displaced rotationally in addition to translationally from the preselected orientation. In order to orientate the articles rotationally, existing methods and apparatus utilize a third force which is rotational in addition to the two linear forces which translationally orientate the article. Apparatus applying a pair of linear forces and a rotational force to an article is described in U.S. Patents 3,038,369 and 3,207,904. Such apparatus for applying combined linear and rotational forces to an article is quite complex. The apparatus for determining the rotational displacement of the article from its desired orientation must perform a variety of involved correlations. In addition, because available scanning or sensing apparatus is basically linear in nature, complex conversions have to be made to provide rotational motion from sensed linear information.

SUMMARY OF INVENTION

The present invention provides a method for positioning in a preselected translational and rotary orientation an article which is displaced from said orientation. The positioning is accomplished by the application of three linear forces. Because the applied forces are all linear, there is no need for the complex apparatus used in the prior art to perform the involved correlations necessary to determine the rotational displacement of the article or to convert sensed linear information into rotational motion.

In the method of this invention, an article is positioned in a plane in a preselected translational and rotational orientation with respect to first and second fixed coordinate axes by applying to the article three linear forces, two of said linear forces acting in a direction perpendicular to one of said coordinate axes and the remaining linear force acting in a direction perpendicular to the second coordinate axis. All of the forces act in the plane of the article and axes.

The orientation may be accomplished by establishing three reference points on the article to be positioned. The first and second of these reference points are to fall on the first coordinate axis and the third reference point is to fall on the second coordinate axis in the preselected orientation. The respective perpendicular distance that each of the three reference points is spaced from the axis upon which it is to fall in the final preselected orientation is determined optically or mechanically.

The first of three linear forces is applied to the article in a direction perpendicular toward the first coordinate axis and initially passing through the first reference point. The force is applied for a distance equal to the determined distance that the first reference point is spaced from the first axis. A second linear force is sequentially or simultaneously applied to the article in a direction perpendicular toward the second axis and initially passing through the third reference point for a distance equal to the distance that the third reference point is spaced from the second axis. A third linear force is sequentially or simultaneously applied to the article in a direction perpendicular toward the first axis for a distance determined by the formula:

$$\text{Distance}=x_1+\frac{A}{a}(x_2-x_1)$$

where $x_1$ is the perpendicular distance of the first reference point from the first axis,
$x_2$ is the perpendicular distance of the second reference point from the first axis,
A is the distance along the first axis between the first and third linear forces, and
$a$ is the distance along the first axis between the perpendicular projections of the first and second reference points.

The present invention also relates to apparatus used in performing the method of this invention including apparatus for sensing the perpendicular distances of each of the three reference points from their respective axes and for generating signals indicative of these distances to three positioning means for respectively applying to the article, three linear forces in response to said signals.

The drawings

PREFERRED EMBODIMENTS

Figure 1A:
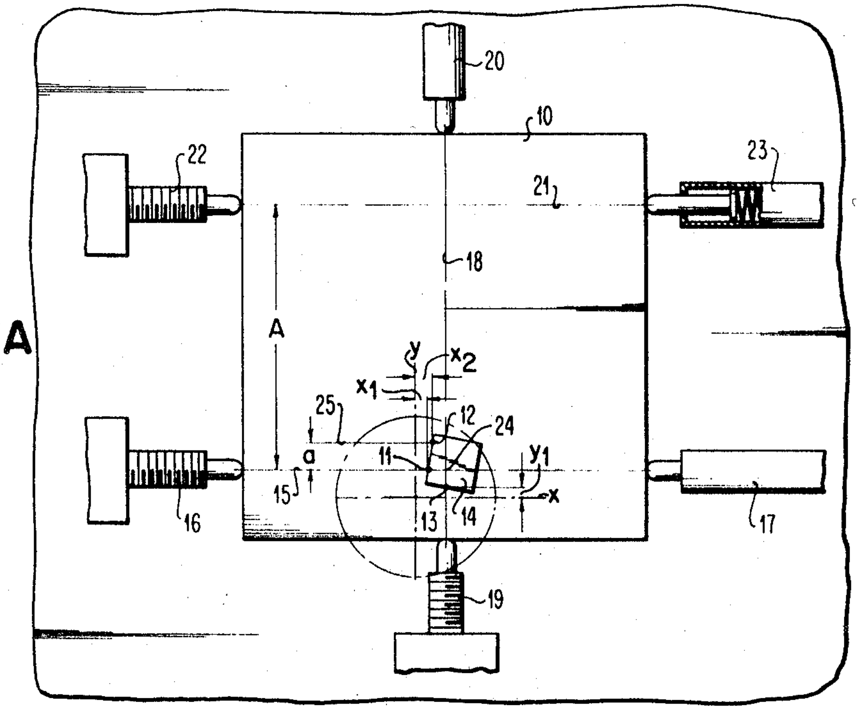
FIG. 1A is a fragmentary plan view of the positioning means and an article in its initial unorientated position.
Figure 1B:
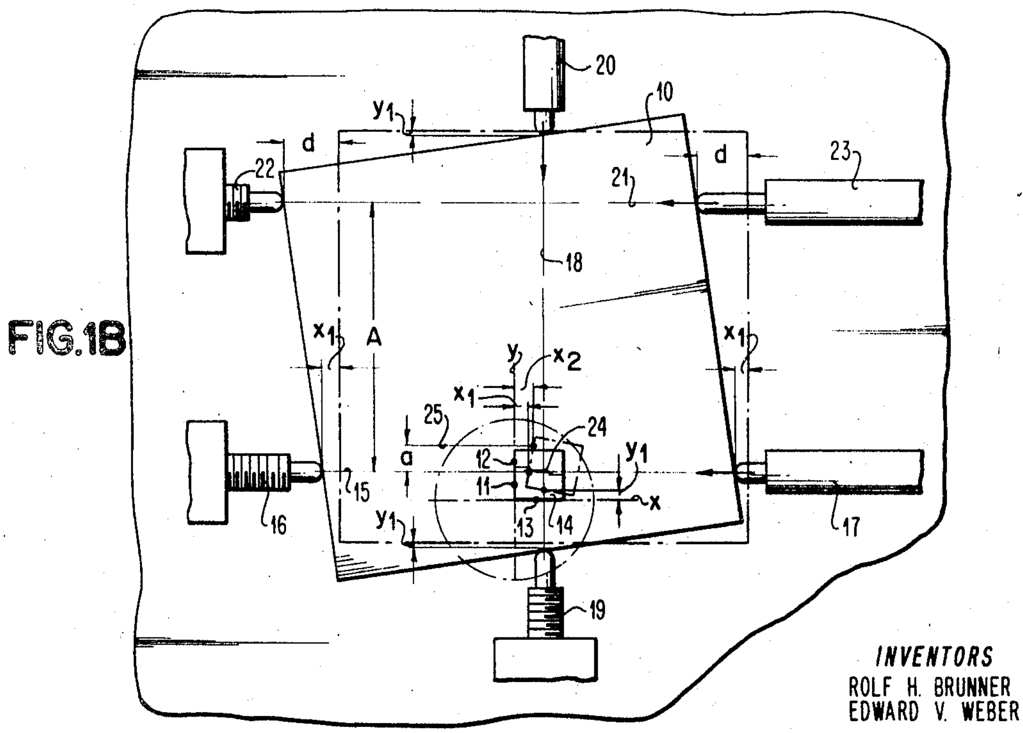
FIG. 1B is the same view of the same positioning means with the article properly orientated.

FIG. 1A shows an article 10 which is to be positioned in a preselected translational (X and Y) and rotational ($\theta$) orientation with respect to the fixed X and Y coordinate axes shown. Article 10 is movable with respect to the fixed coordinate axes. The coordinate axes as shown may be considered to be a projected image onto article 10 or may be contained in an optical device through which article 10 is viewed. Article 10 contains three reference points 11, 12 and 13, two of which, 11 and 12, are to be positioned on the Y axis in the preselected orientation and the third, 13, is to be positioned on the axis. In the present specification and claims, the article is the element to which the three linear forces are applied. The article may itself be the object, such as a mask or a photographic transparency, which is to be orientated with respect to a substrate, or the article may be a platform or pallet supporting an object or workpiece which is actually to be orientated. In the latter case, the workpiece is movable with the article, and the linear forces are applied to the article to move the article in order to bring the workpiece into the proper orientation. FIGURES 1A and 1B show a structure in which article 10 supports workpiece 14. Preferably, the three reference points 11, 12 and 13 on the article are also on the workpiece. In FIG. 1A, workpiece 14 is a chip of semiconductor material which has been attached to the article or platform 10 in the position shown. The chip 14 is to be positioned along the coordinate (X and Y) axes in the final position shown in FIG. 1B.

Considering now, the means for applying three linear forces to platform 10, the first linear force is applied along line 15 perpendicular to the Y axis in either direction by the combination of screw drive 16 and the associated spring loaded plunger 17 which urges the platform against drive 16. The second linear force is applied along line 18 perpendicular to the X axis in either direction by the combination of screw drive 19 and the associated spring loaded plunger 20 which urges the platform against drive 19. The third linear force is applied along line 21 perpendicular to the Y axis in either direction by the combination of screw drive 22 and associated spring load plunger 23 which urges the platform against drive 22. Line 21 is separated from parallel line 15 by a fixed distance. Preferably the workpiece or chip 14 is initially positioned on platform 10 so that the intersection 24 of the line 15 of the first force and the line 18 of the second force lies anywhere within the limits of chip 14. Reference points 11, 12 and 13 are selected as follows: point 11 is the point at which the edge of chip 14 which is to be positioned on the Y axis in the final orientation is intercepted by line 15; point 13 is the point at which the edge of chip 14 which is to be positioned on the X axis is intercepted by line 18 and point 12 is the point where a line 25, which is intermediate and parallel to lines 15 and 21 at a fixed perpendicular distance from line 15, intercepts the edge of chip 14 which is to be positioned on the Y axis.

The distances $x_1$ and $x_2$ which reference points 11 and 12 are from the Y axis along lines 15 and 25 respectively as well as the distance $y_1$ which reference point 13 is from the X axis are determined. These distances may be determined visually, mechanically, e.g., contact probes or by conventional scanning means which will be hereinafter described in greater detail.

The first linear force is applied to platform 10 along line 15 in the direction indicated by the arrow in FIG. 1B to displace platform 10 for the distance $x_1$ on line 15 toward the Y axis. This is accomplished by withdrawing screw drive 16 for a distance $x_1$; spring loaded plunger 17 which urges the platform 10 against drive 16 will displace the platform for the distance $x_1$. This movement also displaces mounted chip 14 for a distance of $x_1$ along line 15. The displacement may be seen in FIG. 1B in which the original position of the platform 10 and mounted chip 14 is shown in phantom lines and the final orientated position after all three linear forces have been applied is shown in solid lines. The second linear force is applied to platform 10 along line 18 in the direction indicated by the arrow to likewise displace platform 10 for the distance $y_1$ on line 18 toward the X axis. This is done by withdrawing screw drive 19 for a distance $y_1$; spring loaded plunger 20 which urges the platform 10 against drive 19 will displace the platform for the distance $y_1$. This movement also displaces mounted chip 14 for a distance of $y_1$ along line 18. The third linear force is applied to platform 10 along line 21 in the direction indicated by the arrow to displace platform 10 for the distance $d$ on line 21 toward the Y axis. This is done by withdrawing screw drive 22 for a distance $d$; spring loaded plunger 23 which urges the platform 10 against drive 22 will displace the platform for the distance $d$. The distance $d$ is determined by the following formula:

$$d=x_1+\frac{A}{a}(x_2-x_1)$$

where $x_1$ and $x_2$ are known, having been described,

A is the fixed perpendicular distance separating lines 15 and 21, and $a$ is the fixed perpendicular distance separating lines 15 and 25.

This movement will displace mounted chip 14 for a distance of $x_2$ along line 25. It should be noted that when $d$ is positive, the displacement $d$ along line 21 of the platform is in the same direction as the displacement $x_1$ along line 15. However, if $d$ is negative, the displacement of $d$ is in the opposite direction to that of $x_1$.

Also, where it is structurally feasible, the third linear force may be applied along line 25 instead of line 21, thus passing through reference point 12. In such a case, the formula need not be used in calculating $d$; distance $d$ will equal $x_2$. Likewise, although the first and second linear forces are preferably applied so that the intersection of their lines 15 and 18 lies within the limits of chip 14, either or both of these forces may be applied so that their lines do not pass through chip 14 or through reference points 11 and 13. In such a case, the distances over which said first and second forces would be applied would not be equal to $x_1$ and $y_1$ respectively. However, such distances could be calculated in the same manner that distance $d$ is calculated. For example, if the line 18 of the second linear force did not pass through reference point 13, the distance over which the force would have to be applied along line 18 would be that necessary to move the chip the distance $y_1$ along a line passing through reference point 13.

Although the three linear forces are applied simultaneously, they may also be applied sequentially.

Figure 2:
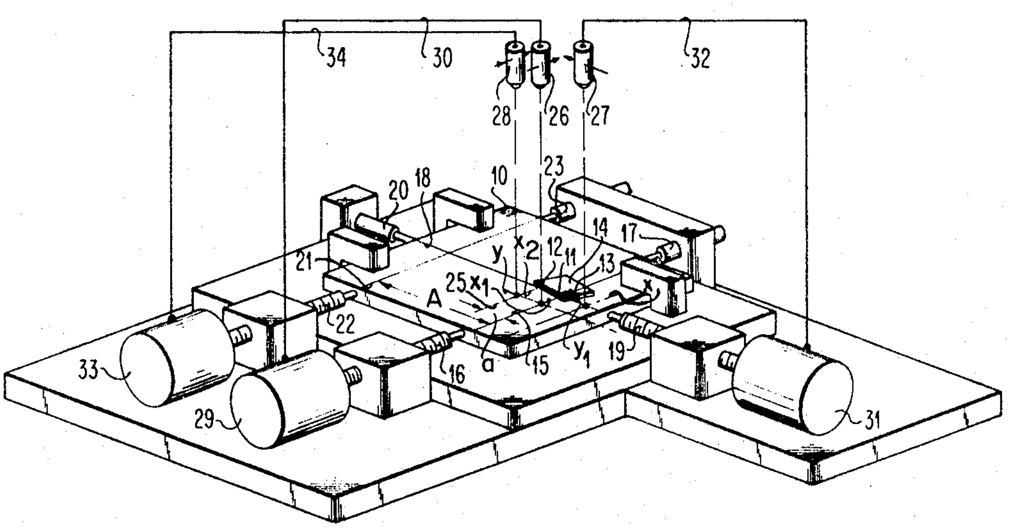
FIG. 2 is a perspective view of one embodiment of the apparatus of this invention.

While the distances $x_1$, $x_2$ and $y_1$ may be determined visually or mechanically and the screw drives 16, 19 and 22 may be moved manually based upon these determinations, in a preferred embodiment as shown in FIG. 2, the distances are sensed by conventional scanning means, e.g., photoelectric cell scanning means, which in turn control three positioning servomotors that respectively drive the three screw drives.

FIG. 2 is a perspective view of the apparatus of FIG. 1A showing the elements in the same positions as in FIG. 1A and further including the sensing means for determining distances $x_1$, $x_2$ and $y_1$ and the three servomotors shown in a generalized manner. Most of the elements and their relationship have already been described with respect to FIGS. 1A and 1B. The sensing means for determining the distances $x_1$, $y_1$ and $x_2$ may be any conventional photoelectrical scanning means. The simplified generalized version shown in FIG. 2 consists of photoelectric scanners 26, 27 and 28 which respectively move along lines 15, 18 and 25. Scanner 26 senses the distance $x_1$ along line 15 and sends a signal indicative of the sensed distance to servomotor 29 through connector 30. Scanner 27 senses the distance $y_1$ along line 18 and sends a signal indicative of the sensed distance to servomotor 31 through connector 32. Scanner 28 senses the distance $x_2$ along line 25 and a signal based upon the sensed distance is sent to servomotor 33 through connector 34. Based upon the three inputs to servomotors 29, 31 and 33, the motors respectively rotate connected screw drives 16, 19 and 22 to provide the three linear forces along lines 15, 18 and 21.

Figure 5:
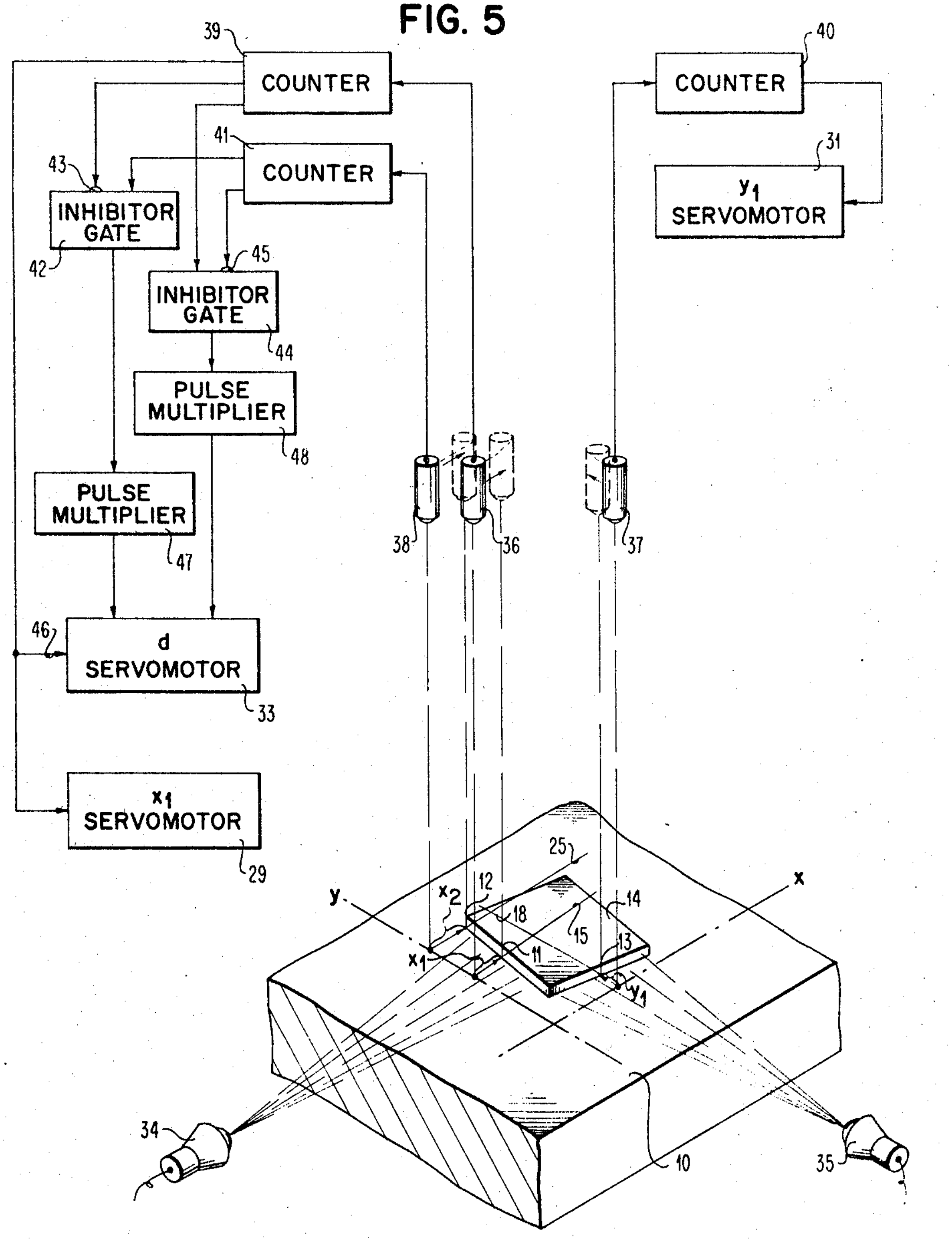
FIG. 5 is a diagrammatic view of scanning and control means which may be used in the apparatus of FIG. 2.

The photoelectric scanning means for sensing the distances $x_1$, $y_1$ and $x_2$ and the means for controlling servomotors 29, 31 and 33 based upon the sensed distances are known in the art. FIG. 5 shows one simplified embodiment of these means, which may be used with the apparatus of FIG. 2. The fixed coordinate (X, Y) reference axes may be projected upon the surface of platform 10 as an illuminated image. The edges of chip 14 which are to be positioned along the X and Y axes are illuminated by light sources 34 and 35 respectively. As photodiode scanner 36, moving along line 15 in the direction shown passes and senses the illuminated Y axis, it produces a signal applied to counter 39 to start the pulse count in the counter which is a fixed frequency oscillator. When scanner 36 crosses the illuminated edge of chip 14, fixing reference point 11, a second signal is fed to counter 39 to indicate end of count. The number of pulses between the two signals which indicates the distance $x_1$ is fed from counter 39 to servomotor 29 which may be a stepping motor. The stepping motor is then stepped an amount relative to the numbers of input pulses to withdraw screw drive 16 for a distance $x_1$ as shown in FIGS. 1A and 1B. Similarly, photodiode scanner 37 moves along line 18 in the direction shown, senses the illuminated X axis and then the illuminated edge of chip 14, fixing reference point 13 and produces first and second signals at the axis and edge crossings respectively. These two signals are applied to counter 40 which produces a pulse count indicative of the distance $y_1$. This pulse count is fed to servomotor 31, a stepping motor which withdraws screw drive 19 for a distance $y_1$.

Photodiode scanner 38 moves along line 25 in the direction shown, senses the illuminated X axis and then the illuminated edge of chip 14, fixing reference point 12 and produces first and second signals at the axis and the edge crossings respectively. These two signals are fed to counter 41 which operates at the same fixed frequency and in synchronism with counter 39. One output of counter 41 is applied to inhibitor gate 42. An output of counter 39 is applied to the inhibitor input 43 of gate 42. As long as pulses are applied to inhibitor input 43, gate 42 will not pass pulses applied from counter 41. Thus, gate 42 will only pass the number of pulses indicative of thed istance by which $x_2$ exceeds $x_1$ or $(x_2-x_1)$. If $x_1$ exceeds $x_2$, in which case the expression $(x_2-x_1)$ would be negative, gate 42 would pass no signal. With respect to inhibitor gate 44, a second output from counter 41 is applied to the inhibitor input 45 of gate 44. Another output of counter 39 is applied to gate 44. As long as pulses are applied to inhibitor input 45, gate 44 will not pass pulses applied from counter 39. Thus gate 44 will only pass the number of pulses indicative of the distance by which $x_1$ exceeds $x_2$ or opposite to gate 42, gate 44 will pass pulses only when the expression $(x_2-x_1)$ is negative. Accordingly, when $x_2$ is greater than $x_1$, only gate 42 will pass the number of pulses by which the scan of $x_2$ exceeds that of $x_1$, and when $x_1$ exceeds $x_2$, only gate 44 will pass the number of pulses by which the scan of $x_1$ exceeds that of $x_2$.

As described in connection with FIGS. 1A, 1B and 2, servomotor 33 controls the application of a linear force to platform 10 over a distance of $d$, determined by the formula, $$d=x_1+\frac{A}{a}(x_2-x_1)$$

This is accomplished as follows: the signal from counter 39, which has previously been described as being applied to servomotor 29, is also applied directly to servomotor 33 through input 46. This signal which is a pulse count indicative of the distance $x_1$ activates servomotor 33 to withdraw screw drive 22 for the distance $x_1$ of the above formula. When $x_2$ exceeds $x_1$, and the expression $(x_2-x_1)$ is positive, gate 42 passes the number of pulses by which the scan of $x_2$ exceeds that of $x_1$. The pulse output of gate 42 is applied to pulse multiplier 47 which multiplies the number of pulses by the constant $A/a$, the determination of which has been previously described. The output of pulse multiplier 47 which is indicative of the distance $$\frac{A}{a}(x_2-x_1)$$

in the above expression is applied to servomotor 33 which in response further withdraws screw drive 22 for the distance $$\frac{A}{a}(x_2-x_1)$$

The linear force along line 21 is thus applied over a distance $$x_1+\frac{A}{a}(x_2-x_1)$$

or $d$. On the other hand, if $x_1$ exceeds $x_2$ and the expression $(x_2-x_1)$ is negative, only gate 44 passes the number of pulses by which the scan of $x_1$ exceeds that of $x_2$. The pulse output of gate 44 is applied to pulse multiplier 48 which multiplies the number of pulses by the constant $A/a$ only when this expression is negative. The output of pulse multiplier 48 is applied to servomotor 33. In response to an input from pulse multiplier 48, the servomotor acts in the direction opposite to the direction of its response to an input from multiplier 47. Thus, screw drive is extended for the distance $$\frac{A}{a}(x_2-x_1)$$

The linear force along line 21 is thus also applied over a distance $$x_1+\frac{A}{a}(x_2-x_1)$$

In the embodiment of FIG. 5, for purposes of clarity, the X and Y axes have been described as being formed by an illuminated image projected onto the surface of platform 10. These axes need not be visible on the platform. They may be applied to the scanning apparatus from other sources. The scanning apparatus of the previously described article appearing at pp. 270–273 of the textbook "Optoelectrical Devices and Circuits" may readily be adapted to determine the distances $x_1$, $y_1$ as well as $x_2$.

Instead of the X and Y coordinate reference axes being illuminated, a second pair of illuminated axes may be used. This second pair of axes which will be referred to as the sensing axes, X′, Y′ should be respectively parallel to the X, Y reference axes on which the article is to be actually placed and at fixed distances from the X and Y reference axes. Thus, when the distances to the X′, Y′ axes are sensed, the sensing apparatus and the control means may be readily adapted to adjust the scanned distances of the three reference points 11, 12 and 13 from the X′, Y′ sensing axes by the respective fixed distances between the sensing coordinate axes and the reference coordinate axes to determine the actual respective distances of the three reference points from the coordinate reference axes.

Although we have shown the three linear forces applied to rectangular structures or platforms in the described embodiments, the principle of positioning structures in preselected translational and rotary orientation by the application of three linear forces to the structures would be applicable irrespective of their shape provided the direction of the three forces is maintained constant. Two of the linear forces must be applied in parallel directions in a plane and the remaining linear force must be applied in a direction perpendicular to the other two forces in the same plane.

Figure 3:
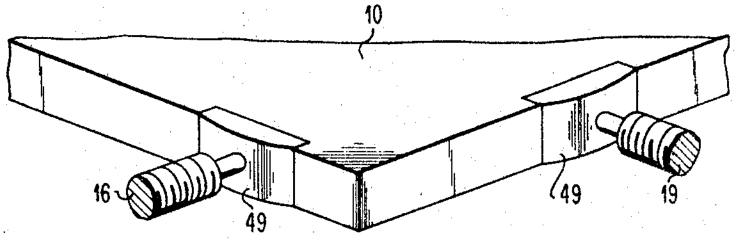
FIG. 3 is a fragmentary perspective view of one desirable arrangement of bearing surfaces through which linear forces may be applied in the apparatus of FIG. 2.

FIG. 3 shows preferred bearing contacts which may be used at the points of engagement between the screw drives and the platform. Because the platform 10 slides against the screw drive contacts during the orientation of the platform as shown in FIGS. 1A and 1B, it is preferable to use bearing inserts 49 (FIG. 3) in the areas of platform 10 which contact the screw drives; screw drives 16 and 19 are shown in contact with the bearing inserts 49. These inserts are of a hard and more wear-resistant material than that of the remainder of the platform. They also have gradual convex curvatures which are preferably arcs from a center formed by the intersection of the lines of the first and second linear forces.

Figure 4:
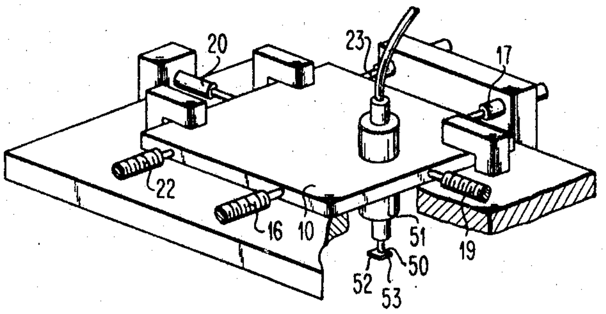
FIG. 4 is a perspective view of another embodiment of the apparatus of this invention.

FIG. 4 shows another embodiment of the present invention wherein the workpiece to be oriented by the movement of platform 10 is not mounted on the platform directly but rather is mounted either above or below the platform. In this embodiment, workpiece or chip 50 is mounted below the platform 10 held by vacuum probe 51 which is rigidly mounted in platform 10. The workpiece 50 is maintained in a fixed translational and rotary position with respect to platform 10. Accordingly, like the previously described workpiece which is directly attached to platform 10, workpiece 50 is also movable only with the platform. The three linear forces which are applied to the platform through screw drives 16, 19 and 22 and their respective complimentary spring loaded plungers 17, 20 and 23 move platform 10 to bring workpiece 50 into a preselected translational and rotary orientation. The three reference points will still lie on the edges 52 and 53 of workpiece 50. For convenience we may assume that workpiece or chip 50 is projected perpendicularly upon the lower surface of platform 10. This would provide the same situation as a chip mounted on the lower surface of platform 10. The scanning means for determining the distances $x_1$, $y_1$ and $x_2$ are not shown but such means may be positioned under the platform to scan across workpiece 50 from below.

On the other hand, if scanning from below is not considered to be structurally desirable or convenient, the position of workpiece 50 may be predetermined before the workpiece is picked up by vacuum probe 51. This may be done by placing the workpiece on a substrate, sensing the distances $x_1$, $y_1$ and $x_2$ of three reference points on the workpiece from coordinate (X, Y) axes on which these reference points are to be respectively positioned in the preselected final orientation and storing the sensed information. The workpiece is then picked up and held by the vacuum probe 51 in the same orientation that was presensed. The stored presensed information is then applied to the servomotors controlling the movement of screw drives 16, 19 and 22 in the same manner as the sensed information was applied to these servomotors in the apparatus of FIGS. 2 and 4. The screw drives are consequently moved by the servomotors to orientate platform 10 to bring workpiece 50 which moves with the platform into the preselected final orientation. The oriented workpiece may then be positioned by the vacuum probe onto an assembly or substrate which is conveyed to a position beneath the probe.

Apparatus for sensing the orientation of the workpiece at one station prior to the positioning station and for conveying the sensed workpiece to the positioning station is described and broadly claimed with respect to the positioning means in the copending commonly assigned application filed by H. Rottmann on or about the filing date of the present application and entitled "Apparatus for Positioning Articles on Substrates." The conveying apparatus and the placement apparatus for the sensed article may be used in combination with the present positioning means in this last embodiment of the present invention.

Figure 6:
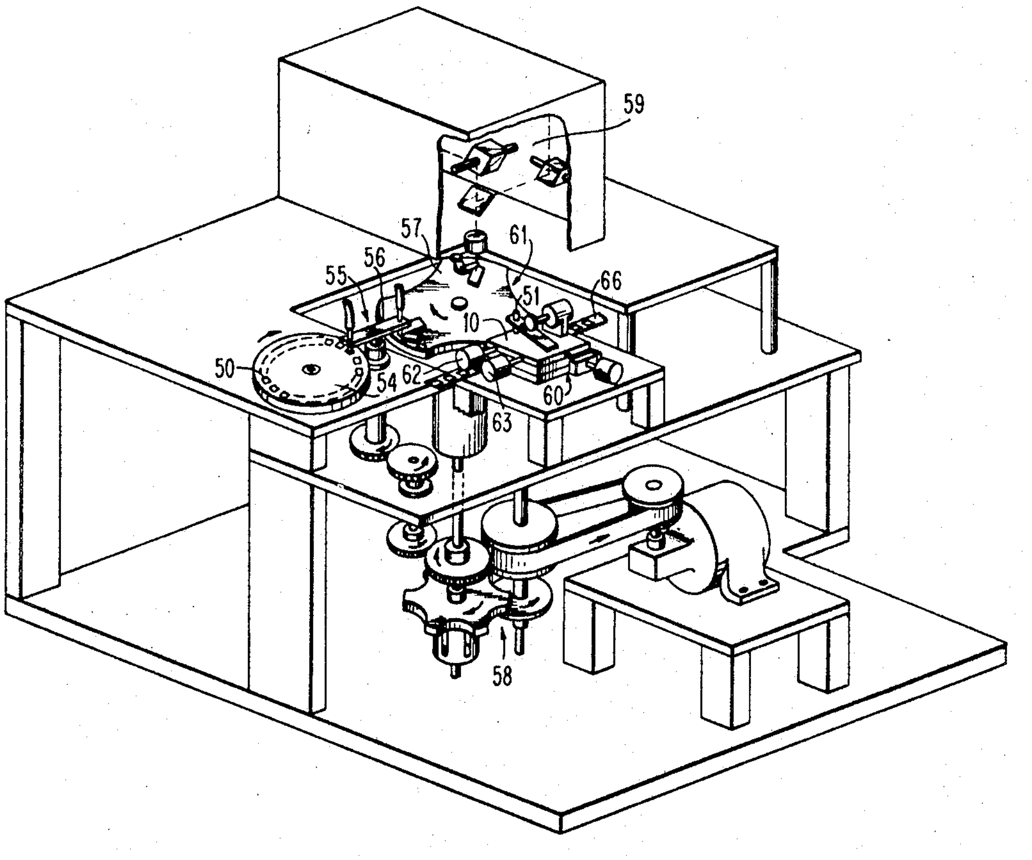
FIG. 6 is a pespective view of general apparatus for carrying out one aspect of the embodiment of FIG. 4.

Referring to FIG. 6, which is the apparatus described in the copending Rottmann application, workpieces 50 having been previously approximately positioned with respect to being right side up and facing in the right direction are carried by rotating dispenser 54 to dispensing station 55 where the workpieces are successively transferred by transfer means 56 to one of three radial chip supporting surfaces on rotary table 57. This table is indexed through a number of stops at fixed angular increments by Geneva drive mechanism 58. Among the stops are a stop at sensing means 59 where the deviation of the initial orientation of the chip from the preselected translational and rotary orientation is determined and a signal generated which indicates this deviation. This signal is transmitted to positioning means 60 at chip placement station 61.

Subsequent to sensing, the rotary table stops the chip at placement station 61 where vacuum probe 51 picks the chip up from the table. The previously described positioning or orientation of the workpiece then takes place through the application of the three linear forces to platform 10 by servomotors 62, 63 and 64 based upon the signal previously received from the sensing means.

After orientation of the chip by the positioning means, table 57 is indexed to bring peripheral opening 65 in the table structure beneath vacuum probe 51. The probe then carries workpiece 50 through the opening 65 to assembly substrate 66 onto which the probe releases the chip and rises again to its initial position. The assembly substrate 66 may be carried to the placement position beneath the probe by any convenient method. One such method is a conveyor tape of the type described in U.S. Patent 3,312,325.

While the invention has been particularly shown and described with reference to the preferred embodiments thereof, it will be understood by those skilled in the art that various changes in form and detail may be made therein without departing from the spirit and scope of the invention.

What is claimed is:

1. A method for positioning an article in a preselected translational and rotary orientation with respect to first and second coordinate axes comprising applying to the article a first linear force in a direction perpendicular to said first axis, a second linear force in a direction perpendicular to said second axis and a third linear force in a direction parallel to that of one of said two forces, all of said forces acting in the same plane.

2. A method for positioning an article in a preselected translational and rotary orientation with respect to first and second coordinate axes comprising:

establishing first and second reference points on said article which are to be positioned on the first axis in the preselected orientation and a third reference point on said article which is to be positioned on the second axis in the preselected orientation;

applying to the article a first linear force in a direction perpendicular toward said first axis and initially passing through the first reference point for a distance equal to the distance of said first reference point from said first axis;

applying to the article a second linear force in a direction perpendicular toward said second axis and initially passing through the third reference point for a distance equal to the distance of said third reference point from said second axis; and applying to the atricle a third linear force in a direction perpendicular toward said first axis for a distance determined by the formula:

$$\text{Distance}=x_1+\frac{A}{a}(x_2-x_1)$$

where $x_1$ is the perpendicular distance of the first reference point from the first axis, $x_2$ is the perpendicular distance of said second reference point from said first axis;

A is the distance along said first axis between said first and third linear forces, and $a$ is the distance along said first axis between the perpendicular projections of the first and second reference points, all of said forces acting in the same plane.

3. The method of claim 1 wherein the article is rectangle-shaped, each of the parallel forces being applied to one of a pair of opposite sides of said rectangle and remaining linear force being applied to one of the other pair of opposite sides of said rectangle.

4. The method of claim 2 wherein the article is rectangle-shaped, each of said first and third linear forces being applied to one of a pair of opposite sides of said rectangle and the second linear force being applied to one of the other pair of opposite sides of said rectangle.

5. Apparatus for positioning an article in a preselected translational and rotary orientation with respect to first and second coordinate axes comprising means for applying a first linear force to said article in a direction perpendicular to said first axis, means for applying a second linear force to said article in a direction perpendicular to said second axis, and means for applying a third linear force to said article in a direction parallel to that of one of said two forces, all of said forces acting in the same plane.

6. The apparatus of claim 5 wherein the article is rectangle-shaped, each of the parallel linear forces being applied to one of a pair of opposite sides of said rectangle and the remaining linear force being applied to one of the other pair of opposite sides of said rectangle.

7. Apparatus for positioning an article in a preselected translational and rotary orientation with respect to first and second coordinate axes comprising:

sensing means for determining the respective perpendicular distances of first and second reference points on said article from the first coordinate axis on which said reference points are to be positioned in the preselected orientation and for determining the perpendicular distance of a third reference point on said article from the second coordinate axis on which said third reference point is to be positioned in the preselected orientation and for generating signals indicative of said sensed information, the perpendicular projections of said first and second reference points on said first axis being a fixed distance apart;

first article positioning means responsive to a signal from said sensing means for applying said article a first linear force in a direction perpendicular toward said first axis and initially passing through the first reference point for a distance equal to said distance of the first reference point from the first axis;

second article positioning means responsive to a signal from said sensing means for applying to said article a second linear force in a direction perpendicular toward said second axis and initially passing through the third reference point for a distance equal to the distance of the third reference point from the second axis; and third article positioning means responsive to signals from said sensing means for applying to said article a third linear force in a direction perpendicular toward said first axis for a distance determined by the formula:

$$\text{Distance}=x_1+\frac{A}{a}(x_2-x_1)$$

where $x_1$ is the sensed perpendicular distance of the first reference point from the first axis, $x_2$ is the sensed perpendicular distance of the second reference point from the first axis, $a$ is the fixed distance between the perpendicular projections of said first and second reference points on said first axis, and A is the distance along the first axis between the first and third linear forces.

8. The apparatus of claim 7 wherein at least one of said article positioning means comprises a shaft with its axis along the line in which the linear force is to be applied and contacting an edge of the article, servomotor means for moving said shaft along its axis and spring means contacting the opposite edge of the article along the line of application of the linear force, said spring means acting linearly to urge said article against said shaft whereby said servomotor in response to a signal from said sensing means moves said shaft along its axis to apply to said article an unbalanced linear force over the determined distance.

9. The apparatus of claim 7 wherein the article is rectangle-shaped, each of said first and third linear forces being applied to one of a pair of opposite sides of said rectangle and the second linear force being applied to one of the other pair of opposite sides of said rectangle.

10. The apparatus of claim 8 wherein the article is rectangle-shaped, each of said first and third linear forces being applied to one of a pair of opposite sides of said rectangle and the second linear force being applied to one of the other pair of opposite sides of said rectangle.

11. The apparatus of claim 10 wherein the portion of the rectangle side contacted by the shaft has a slight convex curvature.

12. The apparatus of claim 8 wherein said shaft is a screw drive and said servomotor rotates said screw drive.

13. The apparatus of claim 5 wherein the article is a platform carrying a workpiece which is movable therewith, the positioning of the article providing a simultaneous attendant positioning of the workpiece.

14. Apparatus for positioning a workpiece in a preselected translational and rotary orientation with respect to first and second coordinate axes comprising:

a movable platform disposed in a plane parallel to the plane of orientation of said workpiece having means for retaining the workpiece in a fixed position with respect to said platform;

sensing means for determining the respective perpendicular distances of first and second reference points on said workpiece from the first coordinate axis on which said reference points are to be positioned in the preselected orientation and for determining the perpendicular distance of a third reference point on said workpiece from the second coordinate axis on which said third reference point is to be positioned in the preselected orientation and for generating signals indicative of said sensed information, the perpendicular projections of said first and second reference points on said first axis being a fixed distance apart;

first platform positioning means responsive to a signal from said sensing means for applying to said platform a first linear force in a direction perpendicular toward said first axis and initially passing through the perpendicular projection of the first reference point on said platform for a distance equal to said distance of the first reference point from the first axis;

second platform positioning means responsive to a signal from said sensing means for applying to said platform a second linear force in a direction perpendicular toward said second axis and initially passing through the perpendicular projection of the third reference point on the platform for a distance equal to the sensed distance of the third reference point from the second axis; and third platform positioning means responsive to signals from said sensing means for applying to said platform a third linear force in a direction perpendicular toward said first axis for a distance determined by the formula:

$$\text{Distance}=x_1+\frac{A}{a}(x_2-x_1)$$

where $x_1$ is the sensed perpendicular distance of the first reference point from the first axis, $x_2$ is the sensed perpendicular distance of the second reference point from the first axis, $a$ is a fixed distance between the perpendicular projections of said first and second reference points on said first axis, and A is the perpendicular distance between the first and third linear forces, said three forces being applied in the plane of the platform whereby the platform is moved to bring the retained workpiece into the preselected orientation.

15. The apparatus of claim 14 wherein at least one of said platform positioning means comprises a shaft with its axis along the line in which the linear force is to be applied and contacting an edge of the platform, servomotor means for moving said shaft along its axis and spring means contacting the opposite edge of the platform along the line of application of the linear force, said spring means acting linearly to urge said platform against said shaft whereby said servomotor in response to a signal from said sensing means moves said shaft along its axis to apply to said platform an unbalanced linear force over the determined distance.

16. The apparatus of claim 14 wherein the means for retaining the workpiece are vacuum means.

17. The apparatus of claim 16 wherein said vacuum means are axially movable in a direction perpendicular to said platform in order to engage and pick up a workpiece from an adjacent substrate.

18. The apparatus of claim 17 wherein said vacuum means is a vacuum probe.

19. Apparatus for positioning a workpiece in a preselected translational and rotary orientation with respect to first and second coordinate axes comprising:

conveying means for receiving the workpiece and conveying the received workpiece through a workpiece sensing station to a workpiece positioning station;

sensing means at said sensing station for determining the respective perpendicular distances of first and second reference points on said workpiece from the first coordinate axis on which said reference points are to be positioned in the preselected orientation and for determining the perpendicular distance of a third reference point on said workpiece from the second coordinate axis on which said third reference point is to be positioned in the preselected orientation and for generating signals indicative of said sensed information, the perpendicular projections of said first and second reference points on said first axis being a fixed distance apart; and positioning means at said positioning station comprising:

a supporter adapted to remove said sensed workpiece from said conveying means and to retain said workpiece in a fixed position with respect to the supporter, and three force means acting on said supporter in a single plane parallel to the plane of orientation of the workpiece including:

first force means responsive to a signal from said sensing means for applying to said supporter a first linear force in a direction perpendicular toward the projection of said axis on said force plane and initially passing through the projection of the first reference point on said force plane for a distance equal to said distance of the first reference point from the first axis, second force means responsive to a signal from said sensing means for applying to said supporter a second linear force in a direction perpendicular toward the projection of said second axis on said force plane, and initially passing through the projection of the third reference point on said force plane for a distance equal to the distance of the third reference point from the second axis, and third force means responsive to a signal from said sensing means for applying to said supporter a third linear force in a direction perpendicular toward said projection of the first axis for a distance determined by the formula:

$$\text{Distance}=x_1+\frac{A}{a}(x_2-x_1)$$

where $x_1$ is the perpendicular distance of the first reference point from the first axis, $x_2$ is the perpendicular distance of the second reference point from the first axis, $a$ is the fixed distance betweeen the perpendicular projections of said first and second reference points on said first axis, and A is the perpendicular distance between the first and third linear forces, whereby the supporter is moved to bring the retained workpiece into the preselected orientation.

20. The apparatus of claim 16 wherein the supporter includes vacuum means.

21. The apparatus of claim 19 wherein said supporter comprises a movable platform to which the three forces are applied, vacuum means mounted on said platform axially movable in a direction perpendicular to said platform to remove said sensed workpiece from said conveying means, said vacuum means retaining said workpiece in a fixed position with respect to the platform.

22. The apparatus of claim 17 wherein said vacuum means is a vacuum probe.

23. The apparatus of claim 19 wherein said supporter is further adapted to selectively release the workpiece after positioning.

24. The apparatus of claim 21 wherein said vacuum means are further adapted to selectively release the workpiece after positioning.

References Cited

UNITED STATES PATENTS

| | | | |
|---|---|---|---|
| 3,188,879 | 6/1965 | Conley | 219—158 XR |
| 3,371,256 | 2/1968 | Eisenbrein et al. | 318—18 |
| 3,390,315 | 6/1968 | McDonough et al. | 318—18 XR |

B. DOBECK, Primary Examiner

U.S. Cl. X.R.

219—158; 318—28